April 19, 1932. C. H. R. COLLINS 1,855,098
APPARATUS FOR MOLDING AND CURING FOOTWEAR
Filed Jan. 30, 1931 4 Sheets-Sheet 1
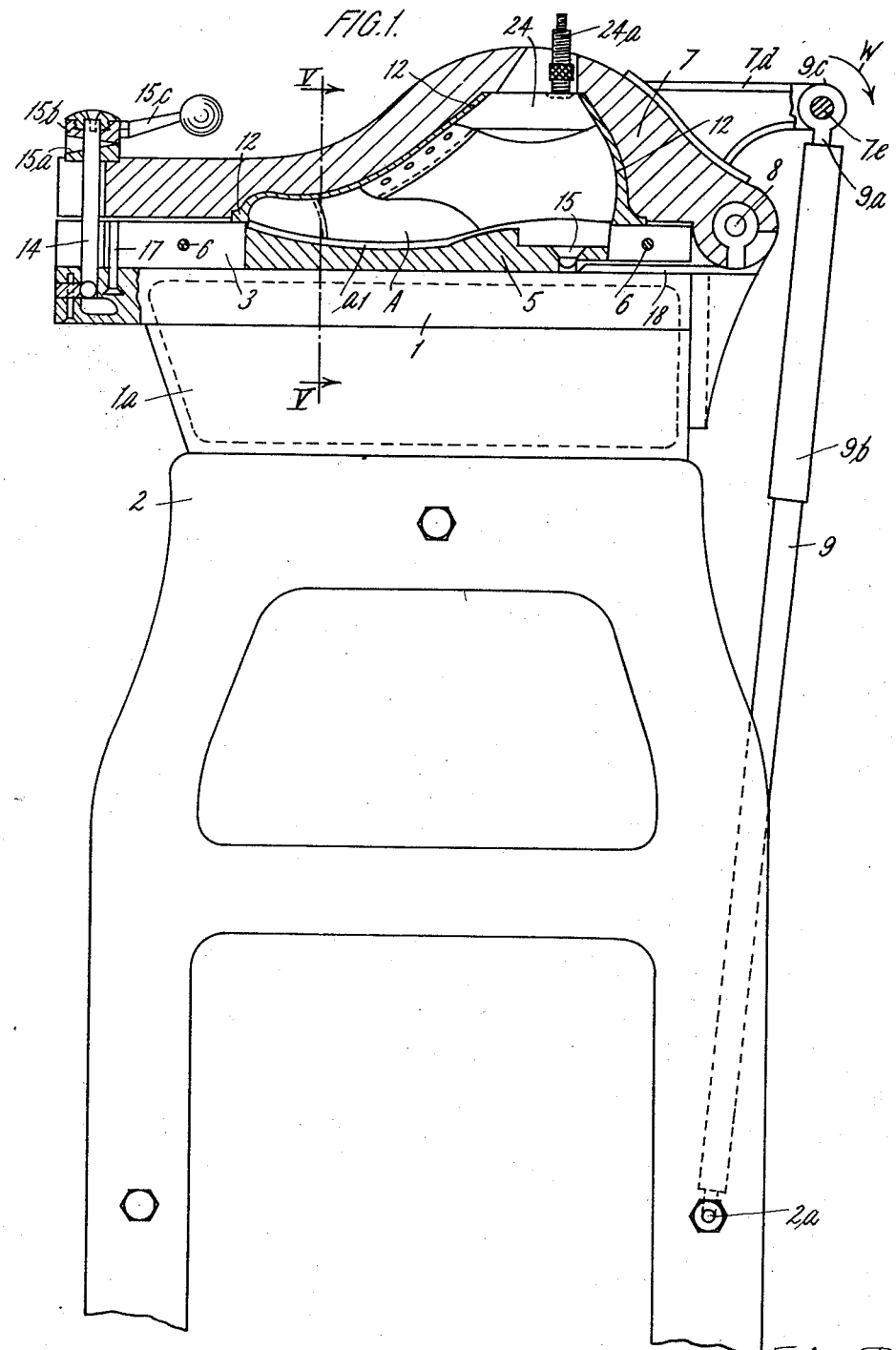

April 19, 1932.   C. H. R. COLLINS   1,855,098
APPARATUS FOR MOLDING AND CURING FOOTWEAR
Filed Jan. 30, 1931   4 Sheets-Sheet 2
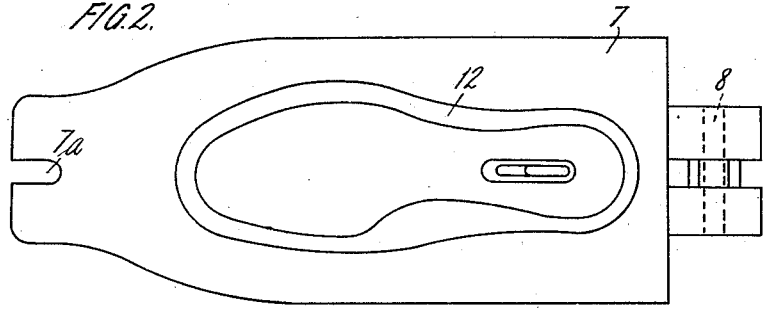
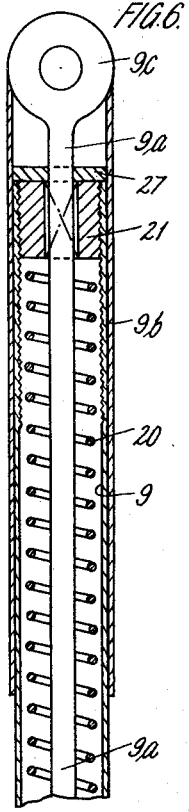
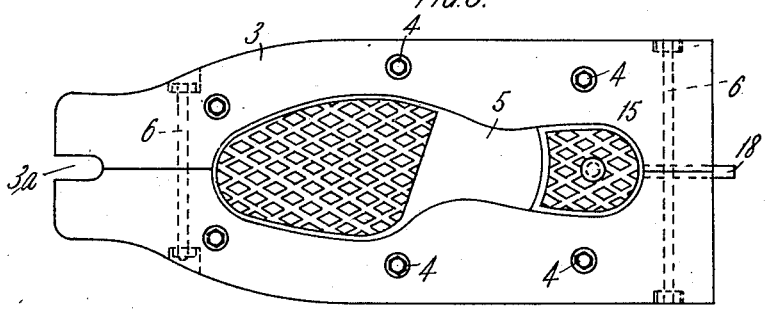
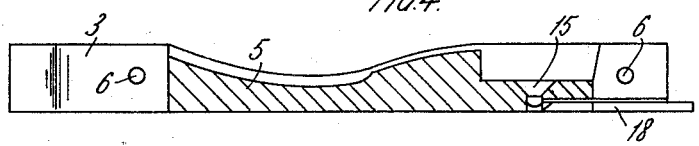
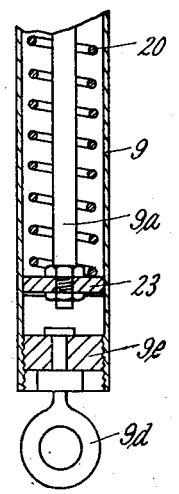
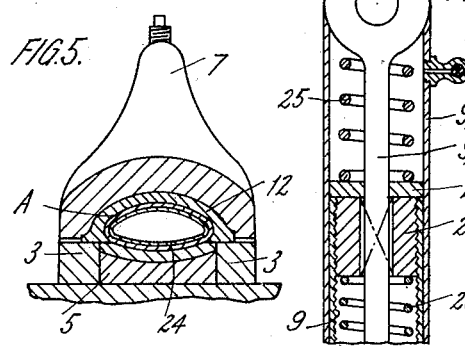
Inventor
Charles H. R. Collins
By Spear, Donaldson & Hall
Attys April 19, 1932. C. H. R. COLLINS 1,855,098

APPARATUS FOR MOLDING AND CURING FOOTWEAR

Filed Jan. 30, 1931 4 Sheets-Sheet 3

Inventor
Charles H. R. Collins
By Spear Donaldson & Fage
Atty

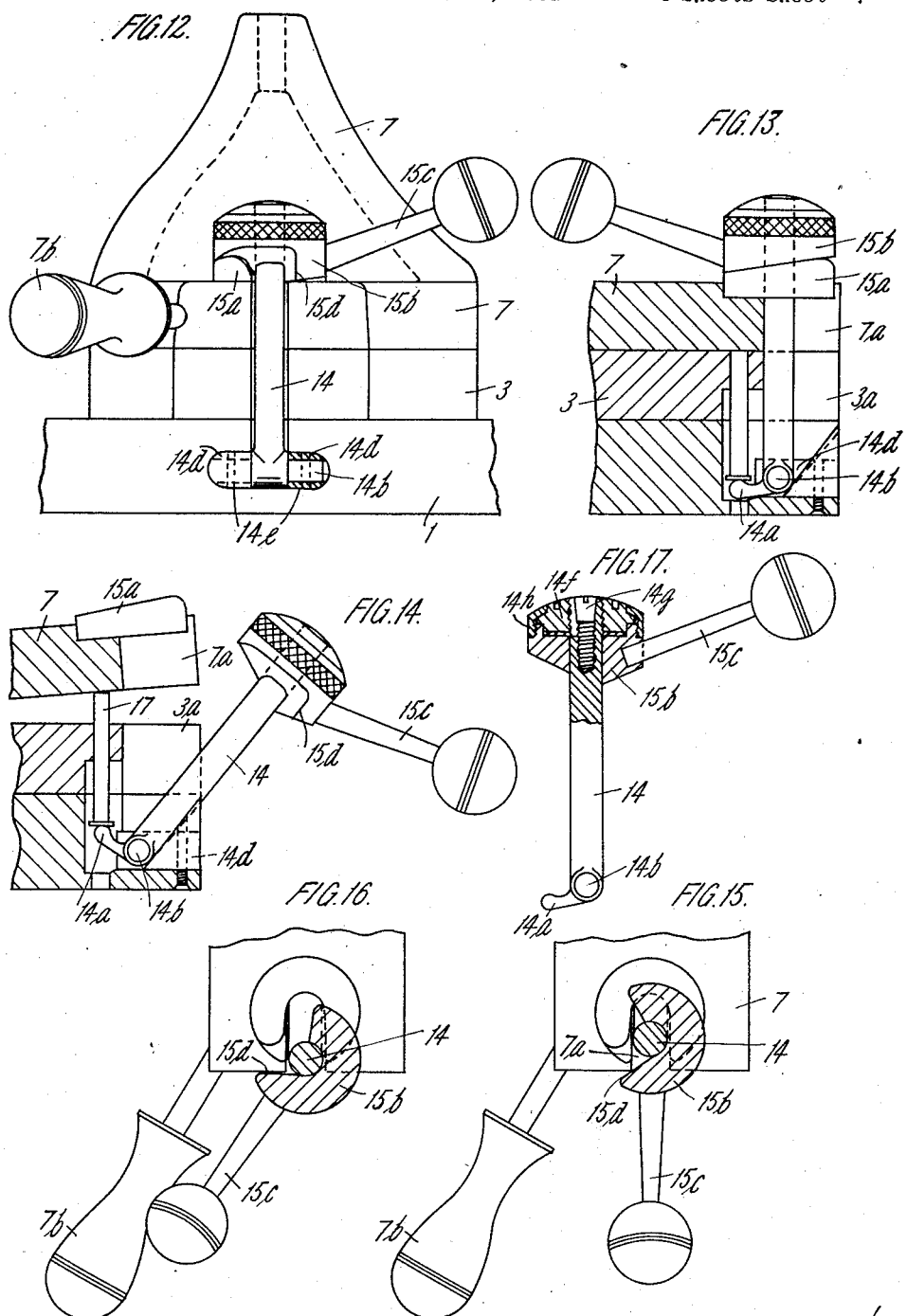

Patented Apr. 19, 1932

1,855,098

UNITED STATES PATENT OFFICE

CHARLES HORACE RUSSELL COLLINS, OF LIVERPOOL, ENGLAND

APPARATUS FOR MOLDING AND CURING FOOTWEAR

Application filed January 30, 1931, Serial No. 512,434, and in Great Britain February 14, 1930.

This invention relates to an improved method of and apparatus for molding footwear composed wholly or partly of rubber or rubber compound, and is particularly applicable to the manufacture of rubber-soled footwear in a heated mold in which the partly prepared footwear is inserted, distended by inflation and cured, and the object is to provide a method and molding apparatus by which a high grade molded and vulcanized product can be produced without the need for the degree of skill required heretofore for this purpose, and whereby a single molding machine of cheap construction may be employed to manufacture footwear of different sizes within a given range.

According to the invention a sleeve of flexible material, or partly of rigid and partly of flexible material is employed as a detachable lining for the metal mold, the interior surface of the sleeve being a counter part of the external configuration of the article to be molded, and the external configuration of the sleeve fitting the interior of the mold. The mold employed in conjunction with the sleeve or lining is preferably a two-part mold comprising a lower part and an upper hinged part, the line of division following the surface of the welt of the shoe. In molding rubber or rubber compound soles and heels on fabric shoes, the sleeve would be fitted to the upper part only of the mold, the sides and bottom of the sole and heel being molded by the metallic surface of the lower part of the mold, the welt and its junction with the upper being molded by the corresponding portions of the sleeve, the rubber to form the sole and heel being roughly plastered on the shoe and the latter, fitted with an inflatable last, being then placed with the surrounding sleeve within the mold and the rubber or rubber compound shaped, and vulcanized by heat.

In this process when carried out in a mold constructed entirely of metal, by reason of the re-entrant angle between the welt and the rounded side portions of the upper, would require to be divided about a vertical medial plane of the shoe, the flexible sleeve however, stretches over the said rounded portion.

It will further be seen that, within limits, different sleeves suitable for molding different sizes of shoes within the same mold may be employed.

The sleeve above referred to is adapted to be fitted around the shoe before it is placed in the mold, such sleeve serving to prevent the rubber compound from flowing or spewing in any direction other than that required, and also serving as a protection for the material employed in the manufacture of the shoe. It will be appreciated that with the use of a sleeve or mold lining as described the shoe need only be quickly and crudely assembled, and the extreme accurracy and gauging in the shaping of the raw sole and heel pieces before assembling is therefore avoided. Moreover the provision of the sleeve considerably facilitates the closing of the mold.

The sleeve may in part be of rigid material, and the flexible part may be of asbestos, rubber, canvas, or any other suitable material; the sleeves may be made interchangeable and may vary in thickness of the walls providing for a slightly larger or smaller fitting shoe, thus avoiding the need for a large number of molds. The sleeve may be divided down the back in a position corresponding with the back seam of the shoe. The bead or rib on the sleeve which forms the welt or sole line of the shoe when necessary may be reinforced by a light metal spring, to help it to retain its shape and contour and fit snugly into position before being placed in the mold. A flange on the sleeve will ensure its correct position and its retention when the mold is closed, during the molding and curing operation. It may be made to recess into the sole shape of the bottom half a small amount and thus seal and entirely eliminate spew, and the need of trimming.

Means associated with the movement of the mold are provided for ejecting the shoe after the cure has been completed, and the mold partly opened, thereby overcoming the difficulty heretofore experienced in the removal of the shoe due to the adhesion of the cured sole to the bottom die.

The hingedly mounted upper part of the mold is adapted to be closed against the action of a spring which on release of the locking device raises the mold into open position exposing the shoe. The tension of this spring may be adjustable to vary the opening movement or the resistance to closing movement of the mold. The spring may be associated with a plunger to which a compressed air supply may be led for the purpose of facilitating the closing of the mold.

The invention is illustrated in the accompanying drawings, in which:—

Fig. 1 is a side elevation partly in section showing apparatus constructed in accordance with the invention and showing the mold in closed position on the hot table. The shoe is shown in position in a sleeve employed in accordance with a feature of my invention.

Fig. 2 is an inverted plan of the upper half of the mold, the sleeve embracing the shoe being shown in position therein.

Fig. 3 is a plan; and

Fig. 4 a section of the bottom plate of the mold with the sole plate in position therein, the shoe ejecting means being indicated diagrammatically.

Fig. 5 is a cross-section on the line V, V of Fig. 1 showing the sleeve fitting into the welt on the shoe.

Fig. 6 is a section showing the means for facilitating the opening of the mold when it is unlocked which means may also be employed as hereinafter explained for bringing the mold into closing position.

Figs. 7, 8, 9, 10 and 11 are detail views of the sleeve.

Figure 7:
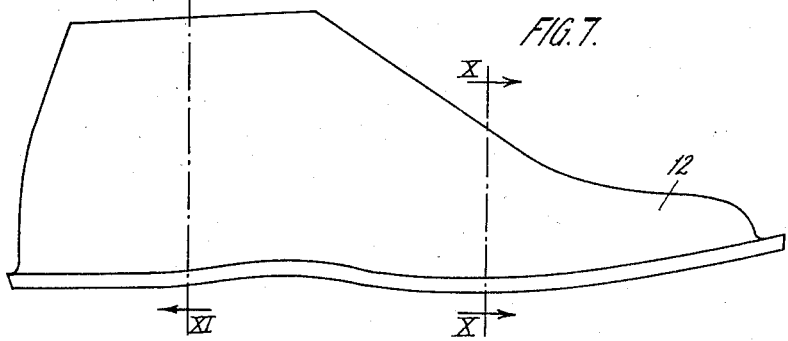
Figure 8:
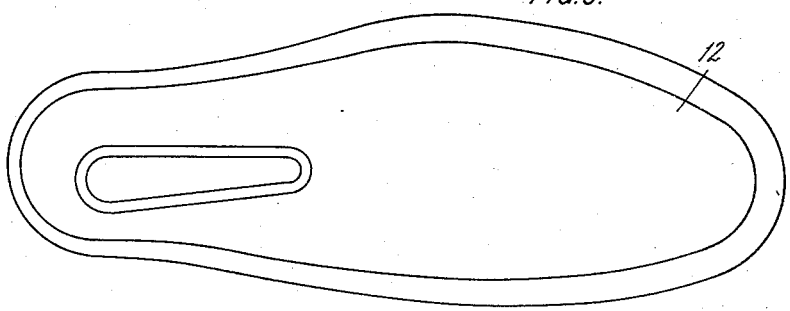

Fig. 7 being an elevation.

Fig. 8 a plan.

Figure 9:
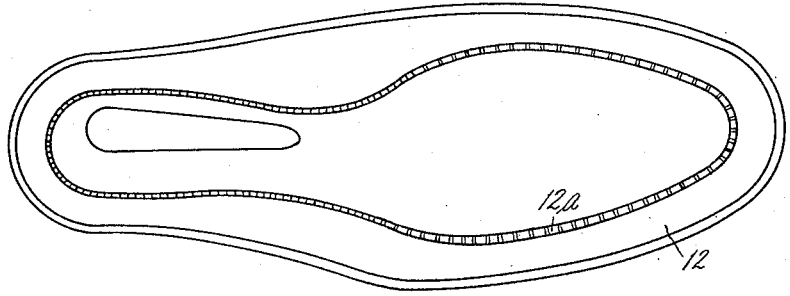

Fig. 9 an inverted plan, and

Figure 10:
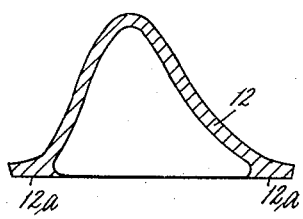
Figure 11:
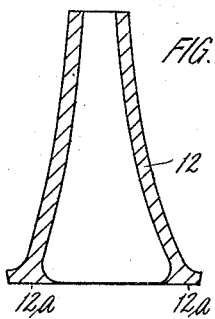

Figs. 10 and 11 transverse sections on the lines X, X and XI, XI, respectively.

Figs. 12 to 17 are detail views of the quick locking and release device.

Fig. 12 being a front elevation;

Fig. 13 a side elevation partly in section;

Fig. 14 a view similar to Fig. 13 and showing the swivel locking bolt in its outward position;

Figs. 15 and 16 plan views with the cam in section showing the mode in which the cam imparts angular movement to the swivel locking bolt; and Fig. 17 is a detail view of the swivel locking bolt and handle cam;

Fig. 6A is a fragmentary view similar to Fig. 6 and shows a modification of the spring control means and buffer for the movable part 7 of the mold.

Referring to the drawings, 1 denotes the hot table of the apparatus the hollow part 1a of which may be supplied with heat in any convenient manner, and which may be of any appropriate length to accommodate one or more molds, and 2 denotes a framework adapted to support the hot table. 3 is the bottom section of the mold adapted to be secured to the hot table by means of bolts 4 and adapted to accommodate the sole plate 5, the bottom section being shown as divided longitudinally into two parts adapted to be screwed together by bolts 6 to hold the sole plate rigidly between them. The bolting of the bottom section to the hot plate ensures maintenance of an even temperature. 7 denotes the main body of the mold which in accordance with the principal features of my invention, in lieu of being divided vertically is in one piece hinged about a hinge pin 8 so that it may be conveniently raised and lowered. The opening movement is facilitated by means of a spring pressed device 9, 9a, 9b attached to the rear of the mold and say to a stay of the legs. The mold body is formed with an opening to admit the valve 24a for inflation of the usual rubber bag or expanding last 24 fitted within the shoe A and is also formed with a recess to accommodate the sleeve 12 which is fitted around the shoe before its insertion in the mold and which serves to control spewing of the rubber.

The sleeve illustrated in Figs. 7 to 10, (which is shown in situ in the mold in Figs. 1 and 5) is of rubber compound, and the parts 12a have their faces indented to form the serrations on the welt a1.

In the embodiment shown there is attached to the front of the mold plate a quick locking and release device consisting of a T-shaped swivel bolt 14 hinged to the front of the hot plate or the like and provided with a cam 15b co-operating with a cam 15a on the mold, this bolt being provided with a tail portion 14a adapted on the bolt being swung down about its hinge to raise a plunger 17 engaging the under surface of the mold part 7 and to initiate the opening movement of the mold.

The ends of the portions 7 and 3 of the mold are slotted as at 7a and 3a, and the swivel locking bolt 14 is arranged so that by pivotal action it can move into and out of the slots, two lugs or hinged-pins 14b are provided on the bolt to form hinge-pins which are pivoted in sleeves 14d housed in recesses 14e formed in the top 1 of the hot plate; the bolt has a lever-like extension 14a which, when the bolt is hinged from the position shown in Fig. 13 to that shown in Fig. 14, engages a plunger 17 raising the latter, and causing its upper end to engage with the hinge parts 7 of the mold and raise the latter, as shown in Fig. 14, the rest of the opening movement being accomplished by the handle 7b fixed to the part 7, the opening movement being facilitated by the spring device 9, 9b, the action of which will be described later. On the bolt 14 is pivotally secured the cam 15b, and to the part 7 is fixed a counterpart cam 15a. The part 15b is provided with a handle 15c and is held in fixed axial position on the bolt 14 by the nut 14f which screws on to the screwed end of the bolt 14 and is fixed in position by a taper screw 14g screwed into a tapped hole in the bolt 14 and expanding the screw-threaded portion so that the nut 14f is held in position. The upper outer surface of the cam 15b is recessed and screw-threaded to take a cap 14h, the interior of which is screw-threaded; the joint action of the cap and nut whilst permitting rotation of the cam 15b holds it fixed in axial position on the bolt.

When the parts are in the position shown in Fig. 12 the cams are in alignment and if the handle 15c be returned to the position shown in Fig. 13 the cams engage and produce the pressure necessary to hold the hinged part 7 of the mold in molding position in relation to the fixed part 3. The under surface of the cam 15b and the upper surface of the cam 15a are helical surfaces, that of the cam 15b ending in a shoulder 15d as shown in Figs. 16 and 17, where this cam is shown in traverse section.

Assuming the molds to be in the closed position shown in Fig. 13, it will be seen that if the handle 15c be rotated in the position shown in Fig. 15 the edge 15d engages with the end of the slot 7a in the part 7, and that further movement of the handle 15c into the position shown in Fig. 16 causes the angular withdrawal of the bolt 14; if the movement of the handle 15c to the position shown in Fig. 16 be sufficiently rapid the bolt 14 is ejected from the slot into the position shown in Fig. 14, the lever 14a having engaged the plunger 17 and raised the mold 7 to the position shown.

The part 7 of the mold is subjected by the spring device 9, 9b, to a turning movement in the direction of the arrow W (Fig. 1), and this assists the opening of the mold, or the spring action may be such as to cause the opening of the mold when the bolt 14 is released, the construction of the spring sleeve is shown in Fig. 6.

9a is a square rod the eyelet part 9c of which is secured by welding or otherwise to, and so as to close the upper end of the outer tube 9b which latter is a sliding fit on the tube 9; the upper end of the interior of the tube 9 is screw-threaded and is provided with a nut or washer 21 having its exterior screw-threaded and its bore of square cross-section, the nut 21 screws in the tube 9 and fits the rod 9a. The lower end of the rod 9a is screw-threaded to take nuts which secure to the end of the rod 9a a washer 23; a spiral spring 20, initially compressed is interposed between the washer 23 and the nut 21; the lower end of the tube 9 is provided with a screw-threaded end plug 9e to which is secured a rotatable eyelet 9d, which eyelet 9d is threaded on one of the stay bars 2a of the main frame 2; and the eyelet 9c is secured to a pin 7e carried by a bracket 7d fixed to the part 7 of the mold.

It will be seen that the initially compressed spring 20 tends to draw the two eyelets 9c and 9d together and therefore tends to turn the part 7 about its hinged pin 8 in the direction of the arrow W.

When the centre of gravity of the mold part 7 as the latter is opened passes across the hinged pin 8, the turning movement due to gravity is in the direction of the arrow W, and in the preferred form a buffer spring 25 is provided to elastically arrest the motion of the part 7. This arrangement is shown in Fig. 6A; in this case a heavy compression spring 25 is introduced between the washer 21 or between a washer 27 in contact with the washer 21, and the eyelet end 9c of the rod 9a, which spring acts as a buffer to elastically limit the motion of the part 7 in the direction of the arrow W.

Where it is desired to relieve the attendant of the labour of closing the mold the washer 27 may be a leather washer fitting the rod 9a and the interior of the outer tube 9b, and a control cock 26 is provided leading to the space between the upper surface of the washer 25 and the eyelet 9c which closes the upper end of the tube 9b, the cock 26 is connected to a supply of air under pressure, and when this cock is opened the air pressure moves the tube 9b upwardly relatively to the tube 9 and imparts closing movement to the mold.

The action of the apparatus for molding a rubber sole to a fabric shoe A is as follows:—

A suitable insole is fitted to the upper of the shoe and there is inserted in the shoe a dilatable last 24 having a nozzle 24a by which it can be connected by suitable compressed air. A suitable quantity of rubber compound to form the sole and heel is roughly plastered in position on the shoe upper; the sleeve 12 is now applied to the shoe upper; the shoe upper, the dilatable last, (which is preferably an inflatable pneumatic last) therein and the sleeve thereon are inserted in the upper part of the mold; the upper part is then closed down and secured in position by the locking means as shown in Fig. 1; the last is dilated to the desired extent. It will be seen that the bottom and sides of the sole and heel are formed by the lower part 3 of the mold and the sole plate 5, and that the edge a1 of the welt is formed by the serrated portion 12a of the sleeve, preferably as to imitate the hand stitching of the usual welt; it will also be seen that the under portion of the sleeve 12 being flexible and therefore following the contour of the rounded portion of the shoe upper, gives a clean joint between the welt and the shoe upper, and prevents the "spewing" of the rubber compound around the lower portion of the shoe upper. The vulcanizing of the rubber sole and heel is produced by the heat transmitted through the hot plate 1, the part 1a of which can be made hollow and be supplied with steam or other heating medium at the necessary temperature.

A number of the molds described are laid side by side on a common hot plate, and the several molds may be manipulated by a single attendant, each mold being held closed for the necessary period to ensure complete vulcanization of the rubber sole and heel; when the vulcanization is completed, the handle 15c is rotated as described, whereupon the bolt 14 is ejected from the slots and the part 7 released, the opening movement being completed, or assisted by the spring device 9, 9b; the spring 25 when fitted serving as a buffer. As the mold is opened the wedge 18 operates the plunger 15 and the latter ejects the shoe. Where the washer 27 and pneumatic control cock 26 are fitted, the mold, when the shoe is inserted in position, may be closed, or its closing be facilitated by pneumatic pressure.

In co-operation with the hinge 8 there may be provided a wedge or the like 18 indicated in Figs. 1, 3 and 4 which on opening the mold is adapted to be pushed forward by an abutment on the hinge 8 and to engage a plunger 15 located in a recess in the sole plate so that on the mold being opened the wedge 18 or the like is pushed forward and the plunger 15 elevated against the action of a spring (not shown) whereby to raise the heel of the shoe and thus the shoe itself from its engagement with the sole plate. The wedge shown may conveniently be replaced by a compressed air supply pipe having a valve operated by the abutment on the hinge and the plunger 15 raised by the compressed air to eject the shoe.

Having now fully described my invention, I declare that what I claim and desire to secure by Letters Patent is:—

1. In apparatus for molding footwear, a heated multiple-part mold, a sleeve having molding parts of flexible material, the sleeve being located in and serving as a detachable lining for one of the mold parts, the interior surface of the sleeve being a counter part of the corresponding external configuration of the upper of the footwear to be molded, and the external configuration of the sleeve fitting the interior of the mold part in which it is located.

2. In apparatus for molding footwear, a heated multiple-part mold, the mold being divided horizontally into two parts, the lower part being of metal and being adapted to shape the under portion and sides of the sole and heel of the footwear, the upper part of the mold being a single part hinged and adapted to receive the upper of the footwear, a detachable sleeve or lining located between the upper and the upper part of the mold and an inflatable last in the upper, said upper mold part, sleeve and last being adapted to mold the welt, and the moldable portions of the footwear above the welt.

3. In apparatus for molding and curing footwear in combination, a heated multiple-part mold, and a detachable sleeve adapted to embrace the upper of the shoe and having a flexible part adapted to fit in the angle between the welt and the rounded portion of the shoe upper, the external surface of the sleeve being adapted to fit the inner surface of the upper part of the mold.

4. Apparatus for molding and curing footwear comprising:—a mold having top and bottom sections, the top section of the mold being in one piece hingedly mounted, means for heating the mold, means for locking the mold in closed position, and a sleeve conforming to the upper of the footwear and serving as a detachable lining for said top section and provided with molding parts of flexible material.

5. Apparatus for molding and curing footwear comprising:—a hot table and a mold divided horizontally the top section of the mold being hingedly mounted to the hot table, and a sleeve conforming to the upper of the footwear and serving as a detachable lining for said top section and provided at the dividing line of the mold with flexible molding parts.

6. Apparatus for molding and curing footwear comprising:—a hot plate, a mold divided along the welt line of the shoe, the bottom section of the mold being fixed to the hot plate, and a sleeve conforming to the upper of the footwear and serving as a detachable lining for a part of the mold and having a molding part at the welt line of the shoe.

7. Apparatus constructed in accordance with claim 4, in which the bottom section is divided longitudinally for the convenient insertion, removal, interchanging and securing of the sole plates, bolts securing said mold section parts together, and a hot plate upon which said mold section is secured.

8. The combination with apparatus constructed in accordance with claim 4, of means for ejecting the footwear from the lower part of the mold as the mold is opened, said means being operated by and during the opening movement of the top part of the mold.

9. The combination with apparatus constructed in accordance with claim 4, of means for ejecting the footwear from the lower part of the mold when the mold is opened, said means comprising a vertically movable plunger adapted to engage the heel of the footwear and a wedge co-operating with the hinge part of the mold and adapted when the latter part is opened to be moved so as to raise the said plunger.

10. Apparatus for molding and curing footwear comprising:—a multiple-part mold in which the top section of the mold is in one piece hingedly mounted, means for heating the mold, means for locking the mold in closed position, a spring actuated device normally tending to open the mold, and a sleeve conforming to the upper of the footwear and removably arranged in the mold and provided with flexible molding parts.

11. Apparatus for molding and curing footwear comprising:—a multiple-part mold in which the top section of the mold is in one piece hingedly mounted, means for heating the mold, means for locking the mold in closed position, and a spring actuated device normally tending to open the mold, said device comprising:—an outer tubular portion adapted to be pivotally connected to one of the two parts of the mold between which there is pivotal action in opening; an inner tube sliding therein adapted to be pivotally connected to the other part of the mold, said inner tube having its interior screw-threaded; an adjusting nut fitting the screw-threaded part; a rod connected to the outer tube extending through the tubes and fitting the bore of the said nut so as to be incapable of rotation relatively thereto; an abutment at the end of the rod; and a spring interposed between the said abutment and the said nut; the outer tube, rod and nut being adapted to be rotated together relatively to the inner tube and thereby adjust the initial degree of compression of the spring.

12. The combination with the elements of claim 11, of a spiral buffer spring interposed between the adjusting nut in the inner tube and the pivoted end of the outer tube.

13. The combination with the elements of claim 11, of pneumatic means for closing the mold, comprising, a washer on the upper surface of the adjusting nut, said washer being a fluid-tight sliding fit on the rod and in the bore of the outer tube, and a control cock connecting the closed interior space of the outer tube above the said washer to a supply of air under pressure.

14. The combination with the elements of claim 11, of pneumatic means for closing the mold, comprising, a washer on the upper surface of the nut, said washer being a fluid-tight sliding fit on the rod and in the bore of the outer tube, a control cock connecting the closed interior space of the outer tube above the said washer to a supply of air under pressure, and a buffer spring interposed between the said washer and the closed end of the hollow tube.

15. Apparatus for molding and curing footwear comprising:—a multiple-part mold in which the top section of the mold is in one piece hingedly mounted, means for heating the mold, a sleeve conforming to the upper of the footwear and removably arranged in the mold and provided with flexible molding parts and means for locking the mold in closed position, comprising, a bolt pivotally connected to the fixed part and provided with a rotatably mounted cam held against axial movement, and a counter part cam fixed to the movable part of the mold, and adapted to be engaged by the cam on the bolt.

16. Apparatus for molding and curing footwear comprising:—a multiple-part mold in which the top section of the mold is in one piece hingedly mounted, means for heating the mold, a sleeve conforming to the upper of the footwear and removably arranged in the mold and provided with flexible molding parts, and means for locking the mold in closed position, means for opening the mold comprising, a plunger mounted in the fixed part of the mold, engaging the movable part of the mold, and adapted when moved axially to open the latter, and a lever fixed to the swivel bolt and adapted when the latter is swivelled out of engagement with the fixed cam to move the said plunger axially to open the mold.

17. Apparatus for molding and curing footwear comprising a mold having a fixed bottom section and a one-piece hinged top section, said top section being provided with a cam, said top section and cam being provided with a slot, a bolt pivoted for movement into and out of said slot, a cam on the bolt engaging said first cam to lock the mold in closed position, said second cam being movable angularly on the bolt out of contact with said first cam, a projecting portion on said second cam adapted to engage the edge of said slot and to impart angular movement to the bolt when this cam is moved angularly out of engagement with said first cam, a plunger in the fixed section of the mold and engaging the hinged section and adapted when moved axially to open the latter, a lever fixed to the bolt and adapted when the latter is moved angularly by said cam projection to move the plunger to open the mold, and means for heating the mold.

In testimony whereof I affix my signature.

CHARLES HORACE RUSSELL COLLINS.